No. 768,635. PATENTED AUG. 30, 1904.
A. E. SUTTON.
WHIFFLETREE HOOK.
APPLICATION FILED APR. 15, 1904.
NO MODEL.
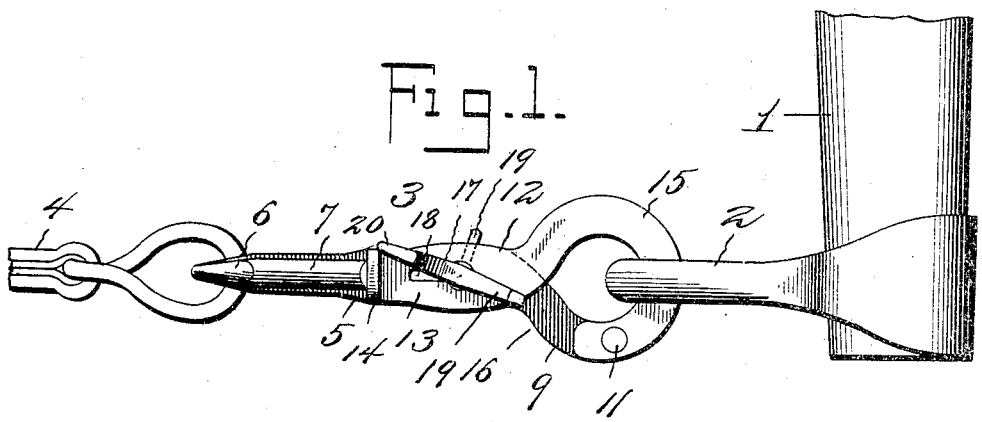
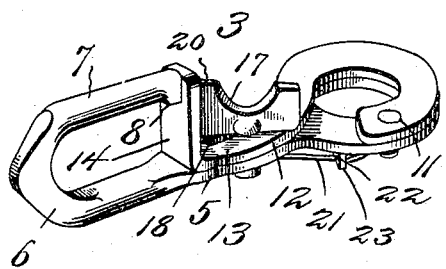
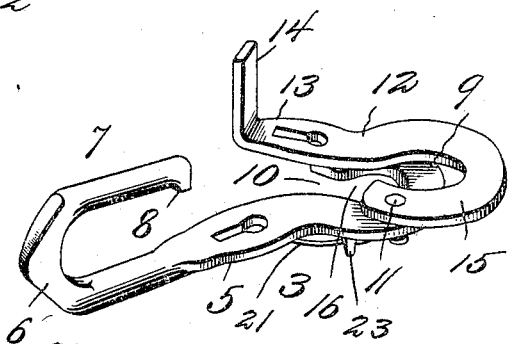
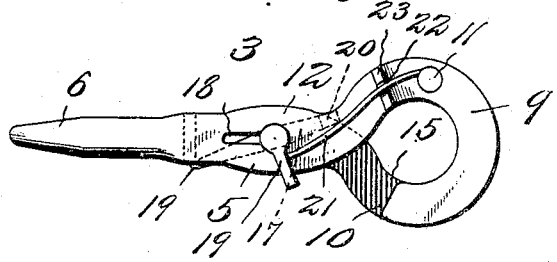
Witnesses
Albert E. Sutton,
Inventor,
by
Attorneys No. 768,635. Patented August 30, 1904.

UNITED STATES PATENT OFFICE.

ALBERT E. SUTTON, OF THOMAS, WEST VIRGINIA, ASSIGNOR OF ONE-HALF TO JOHN B. JENKINS, OF ALBERT, WEST VIRGINIA.

WHIFFLETREE-HOOK.

SPECIFICATION forming part of Letters Patent No. 768,635, dated August 30, 1904.

Application filed April 15, 1904. Serial No. 203,358. (No model.)

*To all whom it may concern:*

Be it known that I, ALBERT E. SUTTON, a citizen of the United States, residing at Thomas, in the county of Tucker and State of West Virginia, have invented a new and useful Whiffletree-Hook, of which the following is a specification.

My invention relates to hooks especially designed for attaching traces to whiffletrees, and has for its object to produce a comparatively simple inexpensive device of this character which in practice will be securely fastened to the whiffletree and will positively prevent accidental disengagement of the trace, one in which the hook will be securely locked in its retaining position, but may be readily unlocked for disengagement from the whiffletree or for releasing the trace.

To these ends the invention comprises the novel features of construction and combination of parts more fully hereinafter described.

In the accompanying drawings, Figure 1 is a view of a portion of a whiffletree, illustrating my improved hook applied for attaching a trace thereto. Fig. 2 is a perspective view of the hook in its closed position. Fig. 3 is a similar view showing the hook open. Fig. 4 is a reverse plan view of the hook.

Referring to the drawings, 1 designates a whiffletree carrying upon its end a clip-eye 2, with which my improved hook 3 is engaged for attaching to the whiffletree a trace 4. These parts, with the exception of the hook 3, may be of the usual or any preferred construction and material, inasmuch as they constitute no part of the invention.

In the hook 3, constituting the subject of this invention, 5 is a primary member or body formed in any suitable manner from iron or other metal and terminating at its forward end in a hook proper, 6, normally disposed in a vertical plane, the upper rearwardly-extending arm 7 of the hook being provided at its rear end with a depending shoulder 8, while the body or shank 5 terminates at its rear end in an eye 9, normally disposed in a horizontal plane or, in other words, in a plane at right angles to the plane of the hook proper, the eye 9 being provided with a lateral entrance-opening 10. Pivoted to the primary member or body 5 by a rivet or other pintle 11 is a secondary retaining or closure member 12, formed from metal and comprising a shank or body portion 13, terminating at its forward end in a right-angularly-disposed arm or portion 14, designed in practice to overlie and close the entrance to the hook 6, said shank being provided at its rear end with an eye 15, disposed in a plane symmetrical with the plane of the eye 9 and provided with an entrance-opening 16, disposed substantially at right angles to the opening 9, whereby when the parts are in normally locking position the eye 9 will be closed by a portion of the eye 15, while the latter will be closed by a portion of the former. It is to be noted, however, that when the member 12 is swung laterally on its pivot the respective openings 10 and 16 will come into alinement, thus permitting the ready engagement of the hook with or its disengagement from the clip-eye 2, while at the same time the hook 6 will be opened to permit free connection or disconnection of the trace 4 therewith.

For holding the members in normal position I provide a locking member or key 17, adapted to pass through registering keyhole-slots 18, formed in the shanks of the members 5 and 12 and engage in rear of the latter through the medium of an angular portion or finger 19, provided on the key. When the key is turned to locking position, one wing of the handpiece 20 abuts against the arm or portion 14 of the secondary member, thus limiting rotation of the key in one direction, its reverse or retrograde movement being prevented by means of a retaining-spring 21, secured upon the rivet 11 and having a free end which lies in the path of the key and after the latter has turned to locking position bears upon the portion or finger 19, it being obvious that the spring will readily yield to permit rotation of the key in either direction when positively operated. The spring is engaged between its ends in the socket or seat 22 of a strengthening member or lug 23, projecting from the adjacent face of the primary member 5.

In practice it is apparent that the key may be rotated until its angular portion or ward 19 registers with the keyhole-slots, when it may be readily removed and the secondary member 12 swung to open or releasing position, as heretofore explained, to permit disengagement of the trace from the hook or the latter as a whole from the whiffletree, and, further, that when the parts are in closed locked position accidental disengagement of any of the parts is wholly and positively obviated.

From the foregoing it is apparent that I produce a simple inexpensive device admirably adapted for the attainment of the ends in view, it being understood that minor changes in the details herein set forth may be made without departing from the spirit of the invention.

Having thus described the invention, what is claimed is—

1. In a device of the class described, a primary member provided with a hook and an eye, said parts having entrance-openings, a secondary member pivoted to the primary member to move laterally thereover in a plane perpendicular to the longitudinal axis of the primary member for opening or closing said entrance-openings, and a key for locking the members against relative movement.

2. In a device of the class described, the combination with a primary member provided with a hook and an eye, said parts having entrance-openings, of a movable secondary member connected with the primary member and designed for closing said entrance-openings, a key for locking the members against relative movement, said key having a portion adapted to abut against a portion of one of the members for retaining the key against movement in one direction, when in locking position, and a spring engaging a portion of the key for preventing its movement in the other direction.

In testimony that I claim the foregoing as my own I have hereto affixed my signature in the presence of two witnesses.

ALBERT E. SUTTON.

Witnesses:
C. E. MEACHER,
GEOR. DREANING.